No. 873,386. PATENTED DEC. 10, 1907.
N. H. ROE.
AXLE NUT.
APPLICATION FILED NOV. 5, 1906.
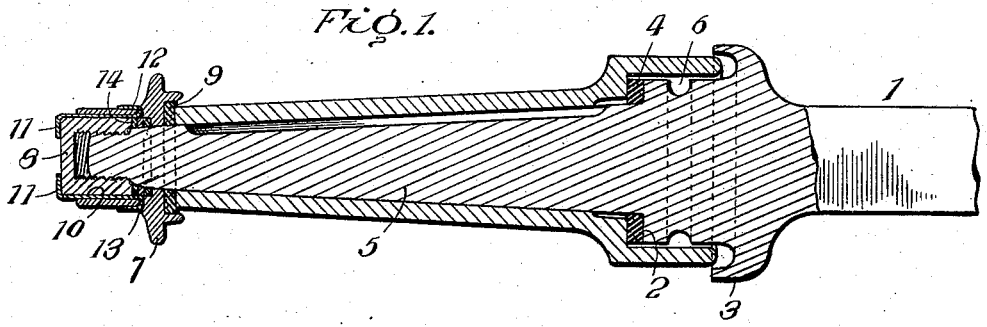
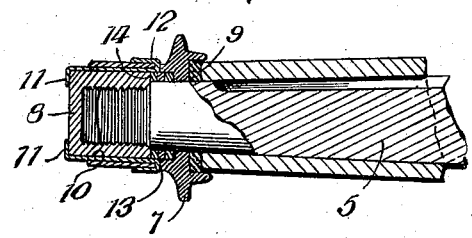
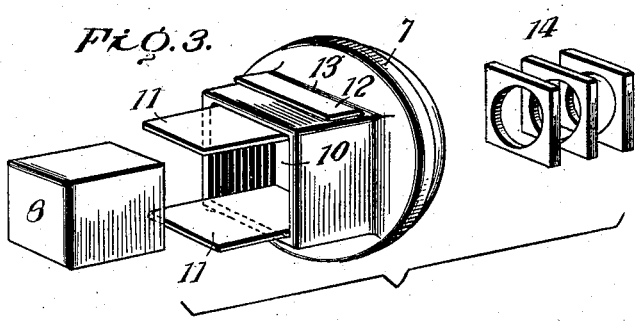
Witnesses
Inventor
Noble H. Roe,
By
Attorneys

UNITED STATES PATENT OFFICE.

NOBLE H. ROE, OF MARCELINE, MISSOURI.

AXLE-NUT.

No. 873,386.  Specification of Letters Patent.  Patented Dec. 10, 1907.

Application filed November 5, 1906. Serial No. 342,097.

*To all whom it may concern:*

Be it known that I, NOBLE H. ROE, citizen of the United States, residing at Marceline, in the county of Linn and State of Missouri, have invented certain new and useful Improvements in Axle-Nuts, of which the following is a specification.

This invention is designed to provide an axle nut of peculiar formation which will admit of taking up wear between the axle box or hub and the shoulder and nut applied to the axle arm, thereby preventing rattling and play of the wheel upon its spindle.

The invention consists of an axle nut formed of sections and one or more washers adapted to be interposed between said sections, thereby admitting of varying the distance between the flange and the threaded or cap members comprising the axle nut.

The invention further consists of an axle nut having a box projected from the flange member to receive the cap or threaded member, and retaining lips projected from the box and adapted to be bent over said cap or threaded member to retain the parts in place when the axle nut is removed from the axle arm or spindle.

For a full description of the invention and the merits thereof and also to acquire a knowledge of the details of construction and the means for effecting the result, reference is to be had to the following description and accompanying drawings.

While the invention may be adapted to different forms and conditions by changes in the structure and minor details without departing from the spirit or essential features thereof, still the preferred embodiment is shown in the accompanying drawings, in which:

Figure 1 is a central longitudinal section of an axle arm or spindle and axle box provided with an axle nut constructed in accordance with this invention. Fig. 2 is a view similar to Fig. 1 of the outer portion of the axle arm, showing a series of washers interposed between the cap and the flange. Fig. 3 is a detail perspective view of the axle nut, the several parts being separated and relatively arranged in a group.

Corresponding and like parts are referred to in the following description and indicated in all the views of the drawings by the same reference characters.

The axle arm or spindle and the axle box may be of any make and are illustrated to show the application of the invention. The axle arm or spindle 1 is provided at its inner end with the usual shoulder 2 and guard 3 and its outer end is reduced and threaded to receive the axle nut. A leather washer 4 is slipped upon the arm or spindle and bears against the shoulder 2 and comes between said shoulder and a corresponding form at or near the inner end of the axle box 5. The axle box 5 is of ordinary construction and is provided at its inner end with an enlarged portion 6 which encircles the shoulder 2 and underlaps the flange of the guard 3, thereby excluding mud and other foreign matter.

The axle nut constituting the basis of the present invention is formed of two parts, namely, the flange 7 and the cap 8. The flange 7 is recessed upon one face to receive a washer 9 which is adapted to abut against the outer end of the axle box 5 and act in conjunction with the washer 4 to prevent play of the box or wheel upon the arm or spindle. A box 10 is formed upon the opposite face of the flange and is adapted to receive the cap 8 and form a housing therefor. Retaining lips 11 project beyond ends of the box 10 and are sufficiently flexible to be bent over the cap 8 to retain the same within the box and prevent accidental separation of the parts 7 and 8 when the axle nut is removed from the arm or spindle 1.

As shown, the plates 12 have their inner ends inserted within the box and their inner terminal portions are passed through slots 13 in the sides of the box and are then bent against the outer sides of the box so as to retain the metal plates in proper position. This constructon admits of replacing the retaining lips, should they become broken by frequent bending necessitated by removal of the cap 8 either to place spacer washers in position or to remove the same as occasion may require.

The cap 8 or threaded member of the axle nut is adapted to screw upon the threaded end of the axle arm or spindle in the accustomed way, and is adapted to be fitted in the box 10 and retained therein by the lips 11 which are bent to overlap the outer end thereof. The cap or threaded member is adjustable with reference to the flanged member 7 and a spacer washer 14 is adapted to be inserted in the box and come between the flange and the member 8 to hold the parts in proper position. The spacer washer 14 may be of any thickness and one or more may be employed as may be found necessary.

When fitting a wheel to an axle arm or spindle and it is found that there is too much play between the ends of the axle box and the shoulder and axle nut, the latter is removed and a spacer washer 14 of proper thickness or two or more spacer washers are placed in position, the thickness being determined by trial or ascertained in any way. The opening in the flange member 7 and in the spacer washer is of a diameter to receive the end portion of the axle arm or spindle adjacent to the reduced threaded portion, hence the cap or threaded member 8 is adapted to screw tight upon the threaded end of said axle arm or spindle and presses the spacer washer and flange member against the outer end of the axle box. The angular formation of the member 8 and the corresponding formation of the box 10 prevents relative turning of the parts 7 and 8 when fitted together.

When the box becomes worn the wear or slack is taken up either by introducing a thicker washer 14 or by placing one or more washers in position between the cap and flange of the nut, as indicated most clearly in Fig. 2. To remove the cap 8, the lips 11 are straightened and after the cap and flange are placed together, they are secured by bending the lips 11 over the outer end of the cap. The construction is such as to admit of the retaining lips being readily replaced by new ones should they become broken or unserviceable from any cause.

Having thus described the invention, what is claimed as new is:

1. An axle nut comprising separable flanged and threaded members, and retaining means for securing the parts when placed together and independent of each of said parts and comprising bendable portions in positive engagement with both the said flanged and threaded members.

2. An axle nut comprising separable flanged and threaded members, one of the parts having a slot, a plate having an end portion passed through said slot and bent and having the opposite end of said plate bent to engage with the other member or part of the nut.

3. An axle nut comprising a flange having a socket and having a slot in a wall of the socket, a plate having an end portion placed within the socket and its extremity passed through the said slot and bent and a threaded member inserted in the socket of the flange and confining the plate therein, the projecting end of said plate being bent to engage with the outer end of said threaded member.

4. An axle nut comprising a flange having a box upon one side and having slots in the sides of the box, plates inserted in said box and having end portions passed through the slots thereof and bent, and a threaded member fitted within the box and confining the said plates therein, said plates having their outer ends bent to engage over the outer end of said threaded member.

In testimony whereof I affix my signature in presence of two witnesses.

NOBLE H. ROE. [L. S.]

Witnesses:
LOUIS T. GUCKER,
JAS. T. HIER.